United States Patent
Devarajan

(10) Patent No.: US 10,397,114 B2
(45) Date of Patent: Aug. 27, 2019

(54) CLIENT COMMUNICATIONS IN MULTI-TENANT DATA CENTER NETWORKS

(71) Applicant: HEWLETT PACKARD ENTERPRISE DEVELOPMENT LP, Houston, TX (US)

(72) Inventor: Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/507,361

(22) PCT Filed: Jun. 18, 2015

(86) PCT No.: PCT/US2015/036344
§ 371 (c)(1),
(2) Date: Feb. 28, 2017

(87) PCT Pub. No.: WO2016/175873
PCT Pub. Date: Nov. 3, 2016

(65) Prior Publication Data
US 2017/0289039 A1    Oct. 5, 2017

(30) Foreign Application Priority Data
Apr. 29, 2015  (IN) .......................... 2202/CHE/2015

(51) Int. Cl.
*H04L 12/741*   (2013.01)
*H04L 12/751*   (2013.01)
*G06F 9/455*    (2018.01)
*H04L 12/46*    (2006.01)

(52) U.S. Cl.
CPC ............ *H04L 45/745* (2013.01); *H04L 45/02* (2013.01); *G06F 9/45533* (2013.01); *H04L 12/4633* (2013.01); *H04L 12/4641* (2013.01)

(58) Field of Classification Search
None
See application file for complete search history.

(56) References Cited

U.S. PATENT DOCUMENTS

2006/0045089 A1*  3/2006  Bacher ................ H04L 12/4641
                                                     370/392
2012/0155467 A1*  6/2012  Appenzeller ........... H04L 45/54
                                                     370/392

(Continued)

FOREIGN PATENT DOCUMENTS

CN     104243318 A     12/2014
CN     104243630 A     12/2014
WO     WO-2014040569 A1  3/2014

OTHER PUBLICATIONS

Alexander Shpiner et al., "SAL: Scaling Data Centers Using Smart Address Learning," 10th CNSM and Workshop, Nov. 10, 2014, pp. 248-253, IFIP.

(Continued)

*Primary Examiner* — Yaotang Wang

(57) ABSTRACT

The present subject matter relates to client communication in multi-tenant data center networks. In an example implementation, a unicast packet comprises a status indicative of one of a forwarding table-match and a forwarding table-miss at a source tunnel end-point (TEP) in a multi-tenant data center network.

20 Claims, 9 Drawing Sheets

(56) References Cited

U.S. PATENT DOCUMENTS

| | | |
|---|---|---|
| 2014/0064278 A1 | 3/2014 | Santos et al. |
| 2014/0115584 A1* | 4/2014 | Mudigonda ......... H04L 67/1095 |
| | | 718/1 |
| 2014/0173104 A1 | 6/2014 | Zhou |
| 2015/0033321 A1 | 1/2015 | Yang et al. |
| 2015/0058470 A1 | 2/2015 | Duda |

OTHER PUBLICATIONS

International Search Report and Written Opinion, International Application No. PCT/US2015/036344, dated Feb. 18, 2016, pp. 1-10, KIPO.

Srini, "Locator and Identifier Seperation Protocol (LISP)—One More Tunnel Protocol," Dec. 31, 2011, pp. 1-30, Random Technical Bits and Thoughts Blog, Available at: <netsecinfo.blogspot.in/2011_12_01_archive.html>.

Sridharan et al., "NVGRE: Network Virtualization using Generic Routing Encapsulation", Network Working Group, Internet Draft, Sep. 2011, 18 pages.

Mahalingam et al., "VXLAN: A Framework for Overlaying Virtualized Layer 2 Networks over Layer 3 Networks", Internet Engineering Task Force, Apr. 10, 2014, 23 pages.

International Preliminary Report on Patentability received for PCT Patent Application No. PCT/US2015/036344, dated Nov. 9, 2017, 9 pages.

Gross et al., "Geneve: Generic Network Virtualization Encapsulation", Network Working Group, Internet-Draft, Aug. 11, 2014, 23 pages.

* cited by examiner

CLIENT COMMUNICATIONS IN MULTI-TENANT DATA CENTER NETWORKS

BACKGROUND

A multi-tenant data center network generally involves a virtual internet protocol (IP) sub-network overlaid on an L3 fabric network. The L3 fabric network has multiple tunnel end-points (TEPs) connected in a meshed topology. The virtual IP sub-network has virtual network devices (VNETs) connected to the TEPs of the L3 fabric network. Clients, such as, personal computers, smartphones, tablets, servers, and the like, can connect to the multi-tenant data center network through any of the VNETs, and can communicate with each other through the respective VNETs and TEPs.

BRIEF DESCRIPTION OF DRAWINGS

The following detailed description references the drawings, wherein.

DETAILED DESCRIPTION

Figure 1:
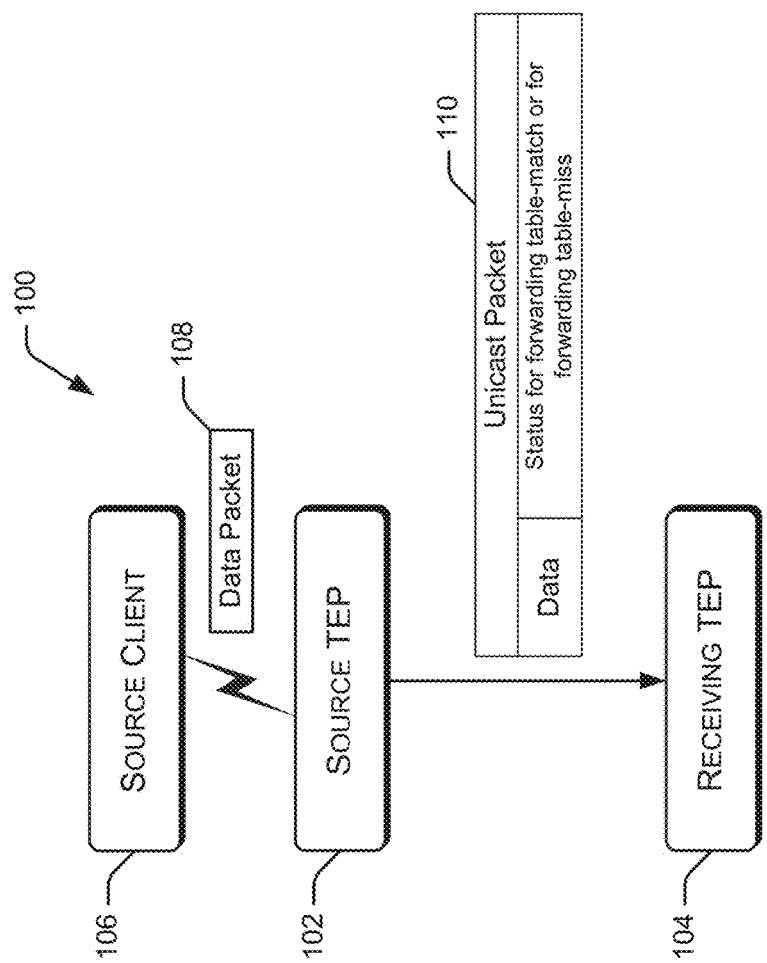
FIG. 1 illustrates a data center network environment, according to an example implementation of the present subject matter.

The present subject matter describes communication between clients in a multi-tenant data center network having a virtual IP sub-network overlaid on an L3 fabric network. Clients may be understood as devices, such as personal computers, smartphones, tablets, servers, and the like, that function as tenants to the multi-tenant data center network. Clients can connect to the multi-tenant data center network to communicate with each other.

A multi-tenant data center network, hereinafter referred to as the data center network, may deploy a tunneling scheme for communication across the L3 fabric network. The tunneling scheme may, for example, be based on a virtual extensible local area network (VxLAN) protocol, a network virtualization using generic routing encapsulation (NVGRE) protocol, a generic network virtualization encapsulation (GENEVE) protocol, or a stateless transport tunneling (STT) protocol. The tunneling scheme allows for the clients to roam across the data center network while retaining their IP address irrespective of the point of connection on the data center network.

The L3 fabric network and the virtual IP sub-network of the data center network are referred to as an underlay network and an overlay network, respectively. The underlay L3 fabric network includes tunnel end-points (TEPs) connected in a meshed topology, such that each TEP is one hop away from any other TEP in the mesh. The overlay virtual IP sub-network includes virtual network devices (VNETs), with one VNET generally connected to one TEP of the underlay network. Clients roaming in the data center network can connect to any of the VNETs, and can communicate with each other through the connected VNETs and TEPs.

The connection between any two TEPs in the mesh is referred to as a tunneling path. According to the tunneling scheme, each TEP in the underlay L3 fabric network maintains a forwarding table with forwarding table (FT) entries for the clients. An FT entry for a client is indicative of a tunneling path applicable for the client, depending on the TEP associated with the client. A TEP is said to be associated with a client, when the client is locally connected to the TEP. A TEP learns about the location of a client and adds an FT entry for the client after receiving data from the client.

When data is to be sent from a source client to a target client, the TEP associated with the source client looks up its forwarding table for the FT entry for the target client. The TEP associated with the source client may hereinafter be referred to as a source TEP. If the FT entry for the target client is present, then the source TEP transmits the data to the TEP associated with the target client based on the tunneling path indicated by the FT entry. The TEP associated with the target client may hereinafter be referred to as a destination TEP. The destination TEP then forwards the data to the target client. If the FT entry for the target client is not present, then the source TEP transmits the data to all other TEPs in the mesh. The transmission of data to all the other TEPs is referred to as "data flooding". The TEPs that receive the flooded data look up their respective forwarding tables. The TEP having the target client, as a local client, forwards the data to the target client. For the purpose of description herein, the presence of an FT entry for a client in a forwarding table during a forwarding table lookup is referred to as a "forwarding table-match", and the absence of an FT entry for a client in a forwarding table during a forwarding table lookup is referred to as a "forwarding table-miss".

The data, whether sent to a destination TEP due to a forwarding table-match or transmitted to all the TEPs due to a forwarding table-miss, can be transmitted by the source TEP in a unicast packet. The unicast packet herein may be understood as a packet configured for sending to a specific receiving TEP. The unicast packet includes the data of the source client for the target client. A TEP receiving the unicast packet cannot distinguish whether the packet is sent due to a forwarding table-match at the source TEP or is flooded due to a forwarding table-miss at the source TEP. In other words, with the unicast packet, the receiving TEP cannot determine whether the source TEP has an FT entry for the target client or not.

Further, when target client is roaming and has moved to a new TEP, the source TEP may not learn about the new TEP, i.e., the TEP currently associated with the target client, until the source TEP receives some data from the target client via the currently associated TEP. Till the source TEP learns about the currently associated TEP, the source TEP may either have a stale FT entry for the target client or have no FT entry at all for the target client. Further, the TEP previously associated with the target client may either have deleted the FT entry indicating the target client as a local client or have an updated FT entry indicating the tunneling path to the TEP currently associated with the target client. In a scenario where the source TEP has a stale FT entry and the previously associated TEP has deleted the FT entry for the target client, the source TEP sends a unicast packet to the previously associated TEP, but the data does not reach the target client. In a scenario where the source TEP has a stale FT entry and the previously associated TEP has the new FT entry for the target client, the source TEP sends a unicast packet to the previously associated TEP, but the previously associated TEP cannot forward the unicast packet to the currently associated TEP for further sending the data to the target client. In both the above scenarios, the data cannot reach the target client, which results in a "traffic black hole" from the source client to the target client. This traffic black hole continues till the source TEP learns about the TEP currently associated with the target client based on data sent by the target client via the currently associated TEP.

Further, in a scenario where the source TEP does not have the FT entry for the target client, the source TEP generates replicated unicast packets and floods the replicated unicast packets to all the other TEPs in the mesh. Each of the TEPs, on receiving a replicated unicast packet, looks up its forwarding table for the FT entry for target client as a local client. The TEP currently associated with the target client then forwards the data to the target client. In this scenario, the source TEP continues to flood replicated unicast packets to all the other TEPs, till the source TEP learns about the TEP currently associated with the target client based on data sent by the target client via the currently associated TEP. This results in increase in network utilization in the underlay network.

The present subject matter describes methods and systems for communication between clients in a multi-tenant data center network. The methods and the systems of the present subject matter facilitate in reducing the time duration of traffic black hole from a source client to a target client and in reducing the network utilization in the undelay network when the target client is roaming and has moved to a new TEP.

In accordance with an example implementation of the present subject matter, a source TEP transmits unicast packets with a status indicative of a forwarding table-match or a forwarding table-miss at the source TEP. With this status in the unicast packet, any receiving TEP can determine whether the source TEP has an FT entry for the target client in its forwarding table or not. With this determination, the receiving TEP can initiate actions, in accordance with the present subject matter, for reducing the time duration of traffic black hole and for reducing the network utilization of the underlay network when the target client has moved to a new TEP.

In a scenario where the source TEP has a stale FT entry and the previously associated TEP has deleted the FT entry for the target client, the source TEP transmits a unicast packet to the previously associated TEP with a status indicative of the forwarding table-match. Since the previously associated TEP does not have the FT entry for the target client, the previously associated TEP determines that the source TEP has a stale FT entry for the target client. At this, the previously associated TEP may send a response message to the source TEP with an indication to delete the stale FT entry for the target client. On receiving the response message, the source TEP may delete the stale FT entry and transmit subsequent unicast packets for the target client to all other TEPs with a status indicative of the forwarding table-miss. With this, the TEP currently associated with the target client, on receiving a unicast packet, sends the data to the target client. The actions initiated by the previously associated TEP and the actions performed by the source TEP, as described above, enable a reduction in the time duration of traffic black hole from the source client to the target client.

In a scenario where the source TEP has a stale FT entry and the previously associated TEP has the new FT entry for the target client indicating the currently associated TEP, the source TEP transmits a unicast packet to the previously associated TEP with a status indicative of the forwarding table-match. The previously associated TEP may forward the unicast packet to the currently associated TEP with a status indicating relaying of the packet by the previously associated TEP. The relaying of the unicast packet to the currently associated TEP helps in substantially eliminating the traffic black hole for the target client. Also, with the status indicating the relaying of the packet, the current associated TEP determines that the previous associated TEP is not the original source of the unicast packet, but a packet forwarder for data from the source client.

Further, since the previously associated TEP has the new FT entry indicating the currently associated TEP, the previously associated TEP determines that the source TEP has a stale FT entry for the target client. At this, the previously associated TEP may send a response message to the source TEP with an indication to update the stale FT entry for the target client. On receiving the response message, the source TEP may update the stale FT entry and transmit subsequent unicast packets for the target client to the currently associated TEP with a status indicative of the forwarding table-match. The actions initiated by the previously associated TEP and the actions performed by the source TEP, as described above, enable a reduction in the time duration of transmission of packets from the source client to the target client.

Further, in a scenario where the source TEP does not have the FT entry for the target client, the source TEP transmits replicated unicast packets to all the other TEPs with a status indicative of the forwarding table-miss. The TEP currently associated with the target client accordingly then sends the data to the target client. Since the unicast packet has the status of the forwarding table-miss, the currently associated TEP determines that the source TEP does not have an FT entry for the target client. At this, the currently associated TEP may send a response message to the source TEP with an indication to add the FT entry for the target client. On receiving the response message, the source TEP may add the FT entry and transmit subsequent unicast packets for the target client to the currently associated TEP with a status indicative of the forwarding table-match. The actions initiated by the currently associated TEP and the actions performed by the source TEP, as described above, enable a reduction in the network utilization of the underlay network.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a data center network environment 100, according to an example implementation of the present subject matter. The data center network environment 100 may be a multi-tenant network environment having a virtual IP sub-network overlaid on an L3 fabric network for client communication. A tunneling scheme based on, for example, a VxLAN protocol, an NVGRE protocol, a GENEVE protocol, or an STT protocol, may be deployed for communication across the L3 fabric network. Clients, such as personal computers, smartphones, tablets, servers, and the like, can roam across the data center network while retaining their IP address irrespective of the point of connection on the data center network.

The L3 fabric network of the data center network environment 100 includes a source TEP 102 and a receiving TEP 104, as shown. The source TEP 102 is a TEP to which a source client 106 is connected locally. The receiving TEP 104 can be any TEP of the underlay network, connected to the source TEP 102 for receiving packets from and transmitting packets to the source TEP 102. Each of the source TEP 102 and the receiving TEP 104 maintains a forwarding table with FT entries for the clients depending on the TEP associated with the respective client. It may be noted that, for the sake of simplicity, only two TEPs, the source TEP 102 and the receiving TEP 104 are shown in the data center network environment 100; however, the data center network environment 100 may include more than two TEPs.

When the source client 106 wishes to send data to a target client, the source client 106 sends data in the form of a data packet 108 to the source TEP 102. The source TEP 102 on receiving the data packet 108 looks up its forwarding table and determines whether the forwarding table has the FT entry for the target client. The source TEP 102 generates and transmits a unicast packet 110 with the data and a status of a forwarding table-match when the FT entry for the target client is present in the forwarding table. The source TEP 102 generates and transmits the unicast packet 110 with the data and a status of a forwarding table-miss when the FT entry for the target client is not present in the forwarding table.

In an example implementation, the source TEP 102 may set a reserved bit in a packet header of the unicast packet 110 to '0' to indicate the forwarding table-match, and set the reserved bit in the packet header to '1' to indicate the forwarding table-miss. The receiving TEP 104, on receiving the unicast packet 110, decodes the packet header to determine the status of the reserved bit, and accordingly determine whether the source TEP 102 has the FT entry for the target client or not. The determination of whether the source TEP has the FT entry for the target client or not, based on the status in the unicast packet, enables initiation of actions to reduce the time duration of traffic black hole and to reduce utilization of the underlay network. The actions initiated based on the determination are described in detail through the description with reference to FIG. 2, FIG. 3, and FIG. 4.

In an example implementation, a TEP of the underlay network may include one or more processors. The processor(s) may be implemented as microprocessors, microcomputers, microcontrollers, digital signal processors, central processing units, state machines, logic circuitries, and/or any devices that manipulate signals based on operational instructions. Among other capabilities, the processor(s) may fetch and execute computer-readable instructions stored in a memory coupled to the processor(s). The memory can be internal or external to the TEP. The memory may include any non-transitory computer-readable storage medium including, for example, volatile memory (e.g., RAM), and/or non-volatile memory (e.g., EPROM, flash memory, NVRAM, memristor, etc.). The functions of the various elements shown in FIG. 1, including any functional blocks referring to a TEP may be provided through the use of dedicated hardware as well as hardware capable of executing computer-readable instructions.

Figure 2:
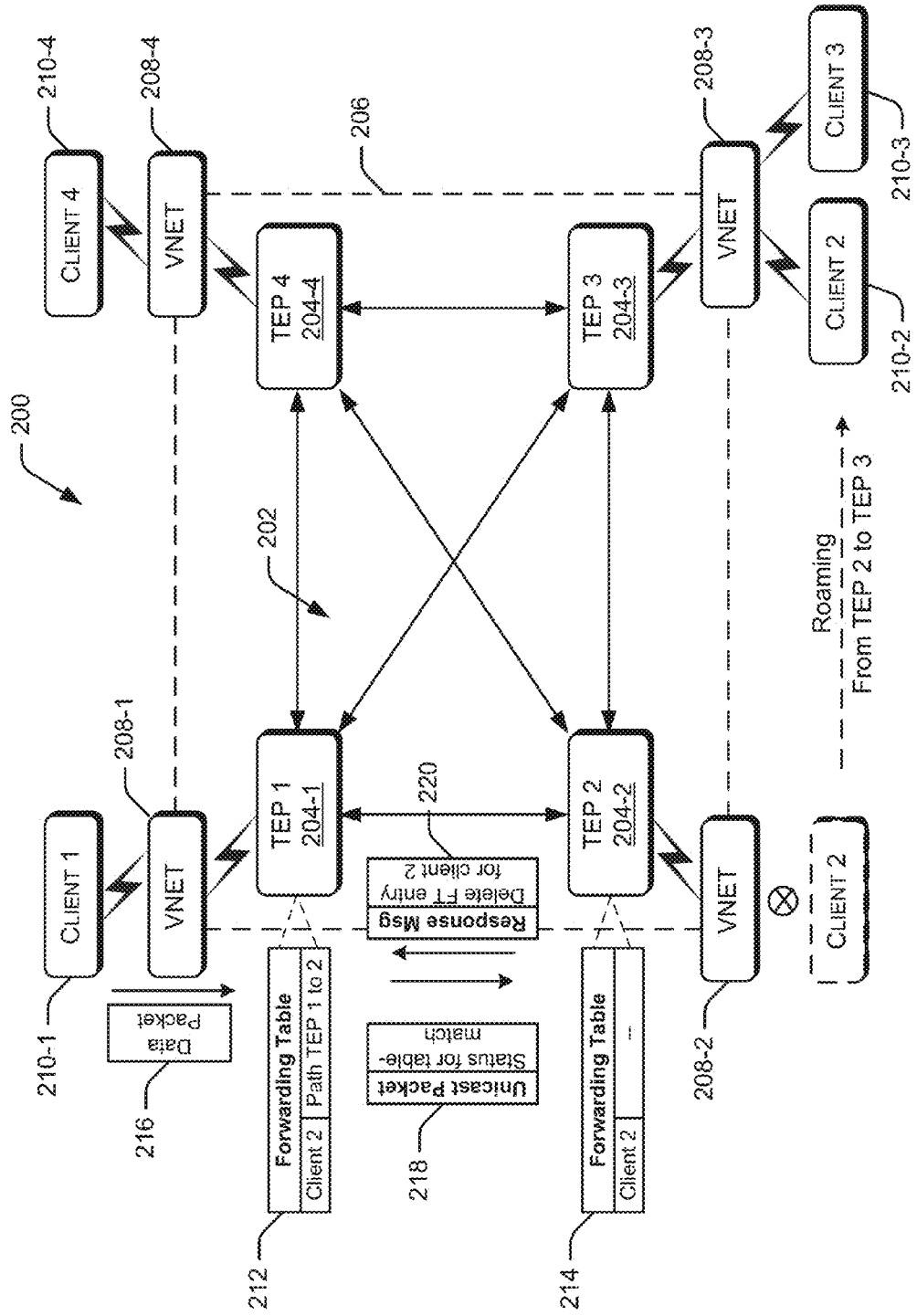
FIG. 2 illustrates a multi-tenant data center network environment for communication between a source client and a target client, according to an example implementation of the present subject matter.
Figure 3:
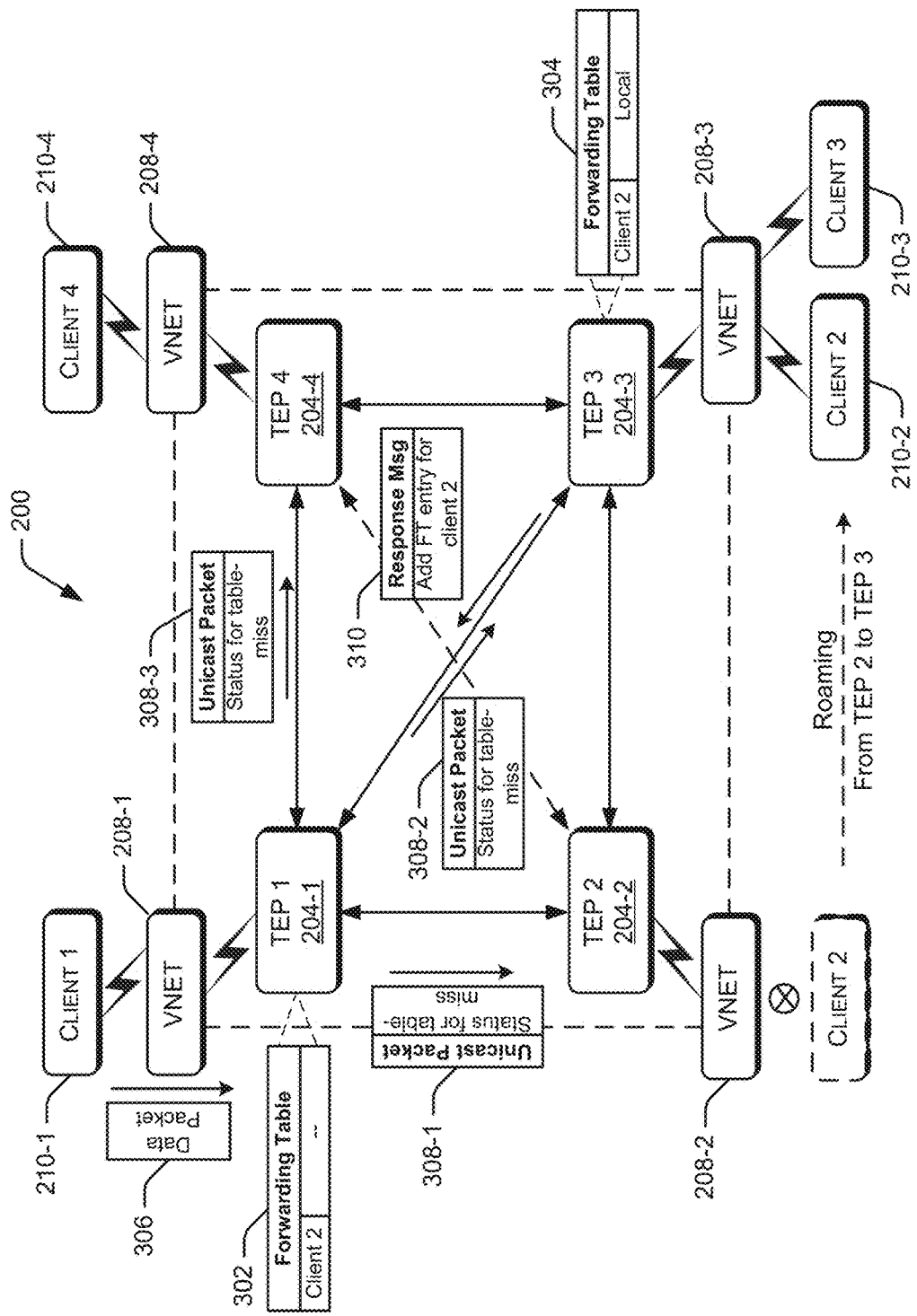
FIG. 3 illustrates the multi-tenant data center network environment for communication between a source client and a target client, according to an example implementation of the present subject matter.
Figure 4:
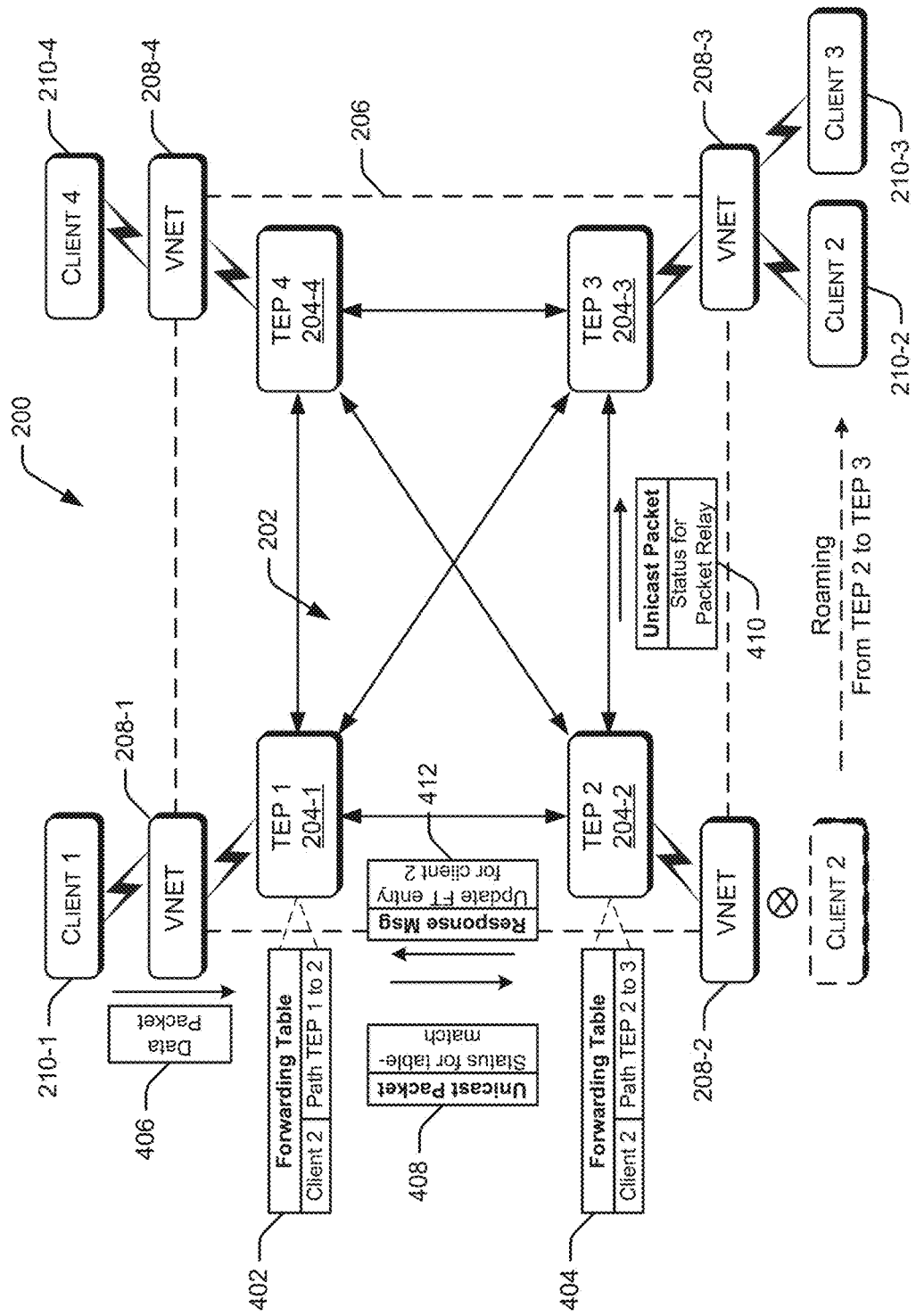
FIG. 4 illustrates the multi-tenant data center network environment for communication between a source client and a target client, according to an example implementation of the present subject matter.

FIG. 2, FIG. 3, and FIG. 4 illustrate a multi-tenant data center network environment 200 for communication between a source client and a target client, according to an example implementation of the present subject matter. As shown, the multi-tenant data center environment 200 includes an underlay network 202 having four TEPs, namely TEP 1 204-1, TEP 2 204-2, TEP 3 204-3, and TEP 4 204-4. The TEPs as shown are connected in a meshed topology, such that each TEP is just one hop away from the other TEP in the mesh. The multi-tenant data center network environment 200 also includes an overlay network 206 having VNETs 206-1, 206-2, 206-3, 206-4, with one VNET connected to one TEP. It may be noted that the VNETs 206-1, . . . , 206-4 may share a same sub-net. Further, as shown, four clients, namely client 1 210-1, client 2 210-2, client 3 210-3, and client 4 210-4, are connected to the VNETs of the overlay network 206. Client 2 is roaming and has moved from TEP 2 to TEP 3.

Each of the TEPs 204-1, . . . , 204-4 maintains a forwarding table with FT entries indicative of tunneling paths for the clients 210-1, . . . , 210-4. Table 1 shows a forwarding table that may be maintained by TEP 1 before client 2 has moved from TEP 2 to TEP 3. Since client 1 is local to TEP 1, the FT entry for client 1 in the forwarding table of TEP 1 does not indicate a tunneling path. Since client 2 is connected to TEP 2, the FT entry for client 2 indicates a tunneling path TEP 1 to TEP 2. Since client 3 is connected to TEP 3, the FT entry for client 3 indicates a tunneling path TEP 1 to TEP 3. Similarly, since client 4 is connected to TEP 4, the FT entry for client 4 indicates a tunneling path TEP 1 to TEP 4.

TABLE 1

| Forwarding Table at TEP 1 | |
|---|---|
| Client 1 | Local |
| Client 2 | Tunneling path TEP 1 to TEP 2 |
| Client 3 | Tunneling path TEP 1 to TEP 3 |
| Client 4 | Tunneling path TEP 1 to TEP 4 |

For the purpose of description herein, consider a case where client 1 wishes to send data to client 2, where client 2 is roaming and has moved from TEP 2 to TEP 3 as shown in FIG. 2 to FIG. 4. Client 1 may be referred to as a source client, and client 2 may be referred to as a target client. Further, TEP 1 may be referred to as a source TEP, and TEP 3 may be referred to as a currently associated TEP of client 2.

FIG. 2 illustrates a scenario where client 2 has moved from TEP 2 to TEP 3, TEP 1 has a stale FT entry for client 2, and TEP 2 has deleted the FT entry for client 2. As shown, the forwarding table 212 of TEP 1 has the FT entry for client 2 indicating a tunneling path TEP 1 to TEP 2, and the forwarding table 214 of TEP 2 has no FT entry for client 2. On receiving the data in the form of a data packet 216 from client 1, TEP 1 looks up its forwarding table 212 and determines whether the forwarding table 212 has the FT entry for client 2. Since TEP 1 has the stale FT entry for client 2, TEP 1 transmits a unicast packet 218 to TEP 2 with the data and a status indicative of a forwarding table-match.

In an example, a reserved bit in a packet header of the unicast packet 218 may be set as '0' to indicate the forwarding table-match. TEP 2 on receiving the unicast packet 218 decodes the packet header and determines based on the status that TEP 1 has the FT entry for client 2. Since TEP 2 does not have the FT entry for client 2, TEP 2 determines that TEP 1 has a stale FT entry for client 2. After determining this, TEP 2 sends a response message 220 to TEP 1 with an indication that the forwarding table 214 of TEP 2 does not include the FT entry for client 2 and TEP 1 can delete the stale FT entry for client 2. In an example implementation, the response message 220 may include the following information: client #=2 and TEP ID=Null. On receiving the response message 220, TEP 1 deletes the stale FT entry from its forwarding table 212. After deleting the stale FT entry for client 2, TEP 1 transmits subsequent unicast packets for client 2 to all the TEPs with a status indicative of a forwarding table-miss. In an example implementation, the reserved bit in the packet header of the unicast packet may be set to '1' to indicate the forwarding table-miss. TEP 3 on receiving the unicast packet from TEP 1 sends the data to client 2.

FIG. 3 illustrates a scenario where client 2 has moved from TEP 2 to TEP 3, TEP 1 does not have the FT entry for client 2. As shown, the forwarding table 302 of TEP 1 has no FT entry for client 2. Since client 2 is moved to TEP 3, the forwarding table 304 of TEP 3 has an FT entry for client 2 indicating that client 2 is local to TEP 3. On receiving the data in the form of a data packet 306 from client 1, TEP 1 looks up its forwarding table 302 and determines whether the forwarding table 302 has the FT entry for client 2. Since TEP 1 does not have the FT entry for client 2, TEP 1 transmits a replicated unicast packet 308-1, 308-2, 308-3 to each of TEP 2, TEP 3, and TEP 4 with the data and a status indicative of a forwarding table-miss. In an example, a reserved bit in a packet header of the unicast packet 218 may be set as '1' to indicate the forwarding table-miss. Each of TEP 1, TEP 2, and TEP 3 on receiving the unicast packet from TEP 1 looks up its forwarding table and determines whether the respective forwarding table has the FT entry for client 2. Since TEP 3 determines from its forwarding table 304 that client 2 is local to it, TEP 3 sends the data to client 2.

Further, since the unicast packet 308-2 has the status of forwarding table-miss, TEP 3 determines based on the status that TEP 1 does not have the FT entry for client 2. After determining this, TEP 3 sends a response message 310 to TEP 1 with an indication that TEP 1 can add an FT entry for client 2. On receiving the response message 310, TEP 1 adds an FT entry for client 2 in its forwarding table 302. After adding the FT entry for client 2, TEP 1 transmits subsequent unicast packets for client 2 to TEP 3 with a status indicative of a forwarding table-match.

In an example implementation, the response message 310 may include the following information: client #=2 and TEP ID=TEP 3. In an example implementation, the response message 310 may also include a timestamp information indicative of a time at which TEP 3 learnt about client 2. The timestamp information allows TEP 1 to add the FT entry for client 2 based on the latest location of client 2.

FIG. 4 illustrates a scenario where client 2 has moved from TEP 2 to TEP 3, TEP 1 has a stale FT entry for client 2, and TEP 2 has an FT entry for client 2 that indicates a tunneling path TEP 2 to TEP 3. As shown, the forwarding table 402 of TEP 1 has the FT entry for client 2 indicating a tunneling path TEP 1 to TEP 2, and the forwarding table 404 of TEP 2 has the FT entry for client 2 indicating a tunneling path TEP 2 to TEP 3. On receiving the data in the form of a data packet 406 from client 1, TEP 1 looks up its forwarding table 402 and determines whether the forwarding table 402 has the FT entry for client 2. Since TEP 1 has the stale FT entry for client 2, TEP 1 transmits a unicast packet 408 to TEP 2 with the data and a status indicative of a forwarding table-match. In an example, a reserved bit in a packet header of the unicast packet 408 may be set as '0' to indicate the forwarding table-match. Since TEP 2 has the FT entry for client 2, TEP 2 forwards a unicast packet 410 to TEP 3 with a status indicating relaying of the unicast packet 410 by TEP 2. In an example implementation, a reserved bit in the packet header of the unicast packet may be set as '1' to indicate that the unicast packet is relayed by TEP 2, and may be set as '0' to indicate that the unicast packet is originally transmitted by the TEP 2. It may be noted that the reserved bit used for indicating the relaying of packets is different from the reserved bit used for indicating the forwarding table-match and the forwarding table-miss. TEP 3 on receiving the unicast packet 410 from TEP 2 sends the data to client 2.

Further, TEP 2 on receiving the unicast packet 408 decodes the packet header and determines based on the status that TEP 1 has the FT entry for client 2. Since TEP 2 has the FT entry for client 2 that indicates the client 2 is local to TEP 3, TEP 2 determines that TEP 1 has a stale FT entry for client 2. After determining this, TEP 2 sends a response message 412 to TEP 1 with an indication that TEP 1 can update the stale FT entry for client 2. On receiving the response message 412, TEP 1 updates the stale FT entry in its forwarding table 402. After updating the stale FT entry for client 2, TEP 1 transmits subsequent unicast packets for client 2 to TEP 3 with a status indicative of a forwarding table-match.

In an example implementation, the response message 412 may include the following information: client #=2 and TEP ID=TEP 3. In an example implementation, the response message 412 may also include a timestamp information indicative of a time at which TEP 2 learnt about TEP 3 having client 2 as a local client. The timestamp information allows TEP 1 to update the FT entry for client 2 based on the latest location of client 2.

Figure 5:
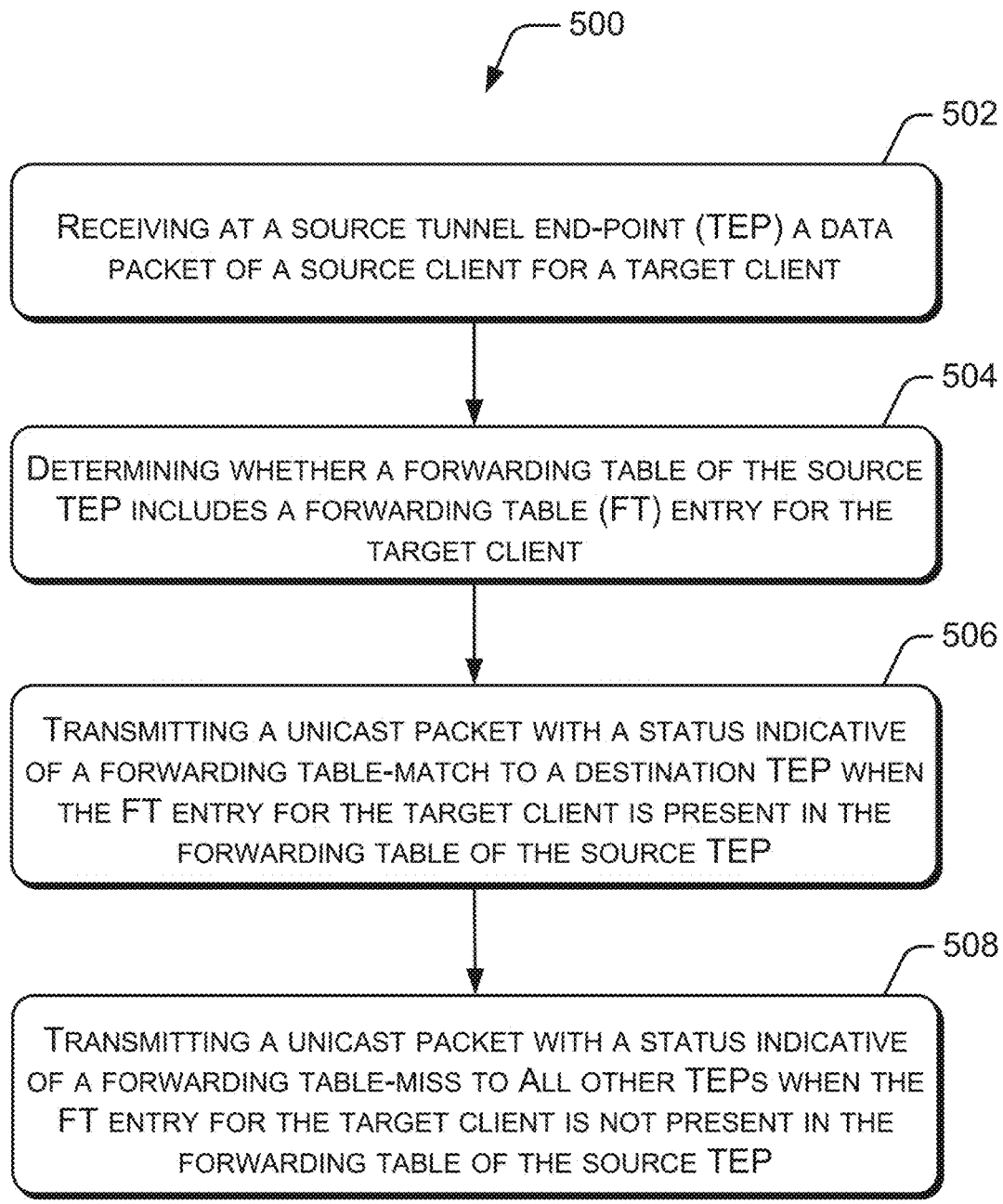
FIG. 5 illustrates a method of client communication in a multi-tenant data center network, according to an example implementation of the present subject matter.

FIG. 5 illustrates a method 500 of client communication in a multi-tenant data center network, according to an example implementation of the present subject matter. The order in which the method 500 is described is not intended to be construed as a limitation, and any number of the described method steps can be combined in any order to implement the method 500. Furthermore, the method 500 can be implemented by processor(s) or computing device(s) through any suitable hardware, a non-transitory machine readable medium, or combination thereof. Further, although the method 500 is described in context of a source TEP in a multi-tenant data center network, other suitable computing devices or systems may be used for execution of at least one step of method 500. It may be understood that steps of method 500 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 5, at block 502, a data packet of a source client for a target client is received at a source TEP. At block 504, it is determined whether a forwarding table of the source TEP includes an FT entry for the target client. Based on the determination, if the FT entry for the target client is present in the forwarding table of the source TEP, then a unicast packet is transmitted to a destination TEP with a status indicative of a forwarding table-match, at block 506. Based on the determination, if the FT entry for the target client is not present in the forwarding table of the source TEP, a unicast packet is transmitted to all other TEPs with a status indicative of a forwarding table-miss, at block 508.

In an example implementation, a reserved bit in a packet header of the unicast packet may be set to a first status, for example '0', to indicate the forwarding table-match, and may be set to a second status, for example '1', to indicate the forwarding table-miss.

Figure 6:
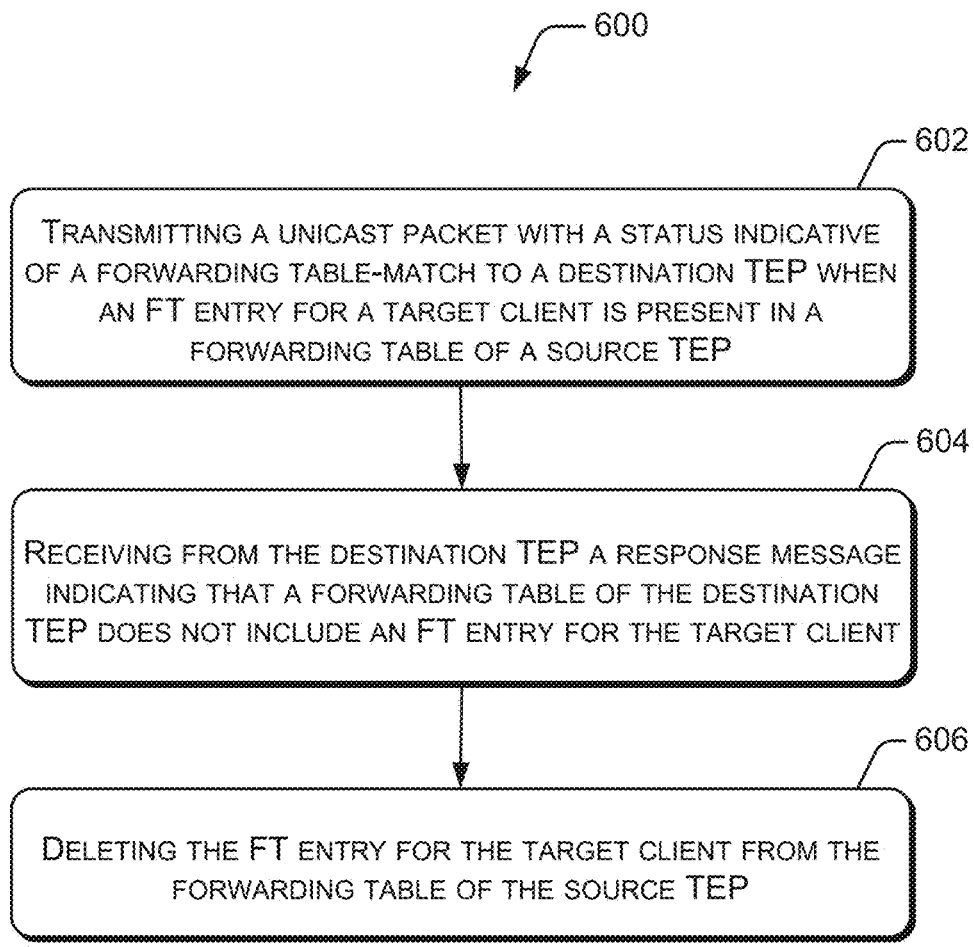
FIG. 6 illustrates a method of client communication in a multi-tenant data center network, according to an example implementation of the present subject matter.

FIG. 6 illustrates a method 600 of client communication in a multi-tenant data center network, according to an example implementation of the present subject matter. The order in which the method 600 is described is not intended to be construed as a limitation, and any number of the described method steps can be combined in any order to implement the method 600. Furthermore, the method 600 can be implemented by processor(s) or computing device(s) through any suitable hardware, a non-transitory machine readable medium, or combination thereof. Further, although the method 600 is described in context of a source TEP in a multi-tenant data center network, other suitable computing devices or systems may be used for execution of at least one step of method 600. It may be understood that steps of method 600 can be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

Referring to FIG. 6, at block 602, a unicast packet is transmitted to a destination TEP with a status indicative of a forwarding table-match when an FT entry for a target client is present in a forwarding table of a source TEP. At block 604, a response message is received from the destination TEP indicating that a forwarding table of the destination TEP does not include an FT entry for the target client. Based on the response message, the FT entry for the target client is deleted from the forwarding table of the source TEP, at block 606. In an example implementation, the response message may include the information of the target client and a TEP ID as "Null".

Figure 7:
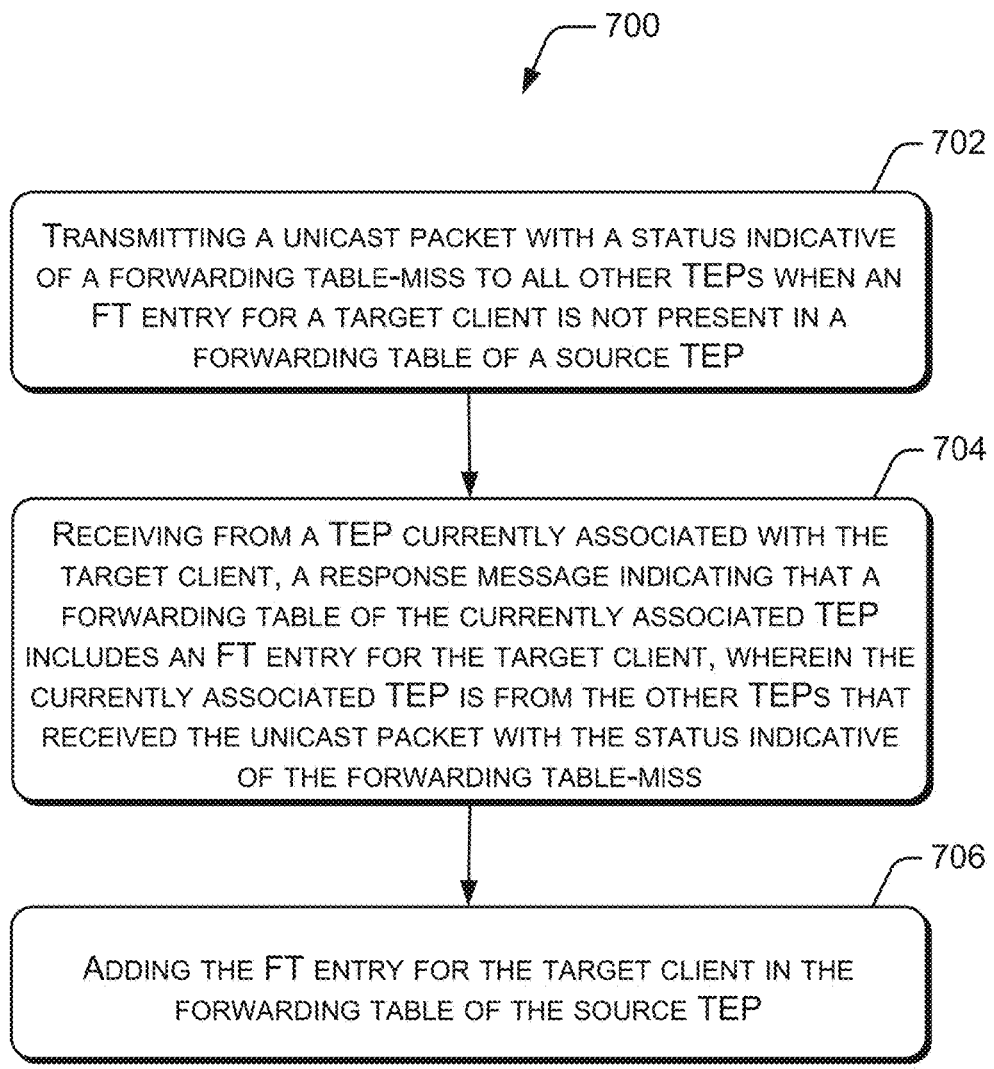
FIG. 7 illustrates a method of client communication in a multi-tenant data center network, according to an example implementation of the present subject matter.

FIG. 7 illustrates a method 700 of client communication in a multi-tenant data center network, according to an example implementation of the present subject matter. The order in which the method 700 is described is not intended to be construed as a limitation, and any number of the described method steps can be combined in any order to implement the method 700. Furthermore, the method 700 can be implemented by processor(s) or computing device(s) through any suitable hardware, a non-transitory machine readable medium, or combination thereof. Further, although the method 700 is described in context of a source TEP in a multi-tenant data center network, other suitable computing devices or systems may be used for execution of at least one step of method 700. It may be understood that steps of method 700 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 7, at block 702, a unicast packet is transmitted to all other TEPs with a status indicative of a forwarding table-miss when an FT entry for a target client is not present in a forwarding table of a source TEP. At block 704, a response message is received from a TEP currently associated with the target client indicating that a forwarding table of the currently associated TEP includes an FT entry for the target client. The currently associated TEP is from the other TEPs that received the unicast packet with the status indicative of the forwarding table-miss. Based on the response message, the FT entry for the target client is added in the forwarding table of the source TEP, at block 706. In an example implementation, the response message may include the information of the target client and a TEP ID as TEP 3. In an example implementation, the response message may also include a timestamp information indicative of a time at which the currently associated TEP learnt about the target client. The timestamp information allows the source TEP to add the FT entry for the target client based on the latest location of the target client.

Figure 8:
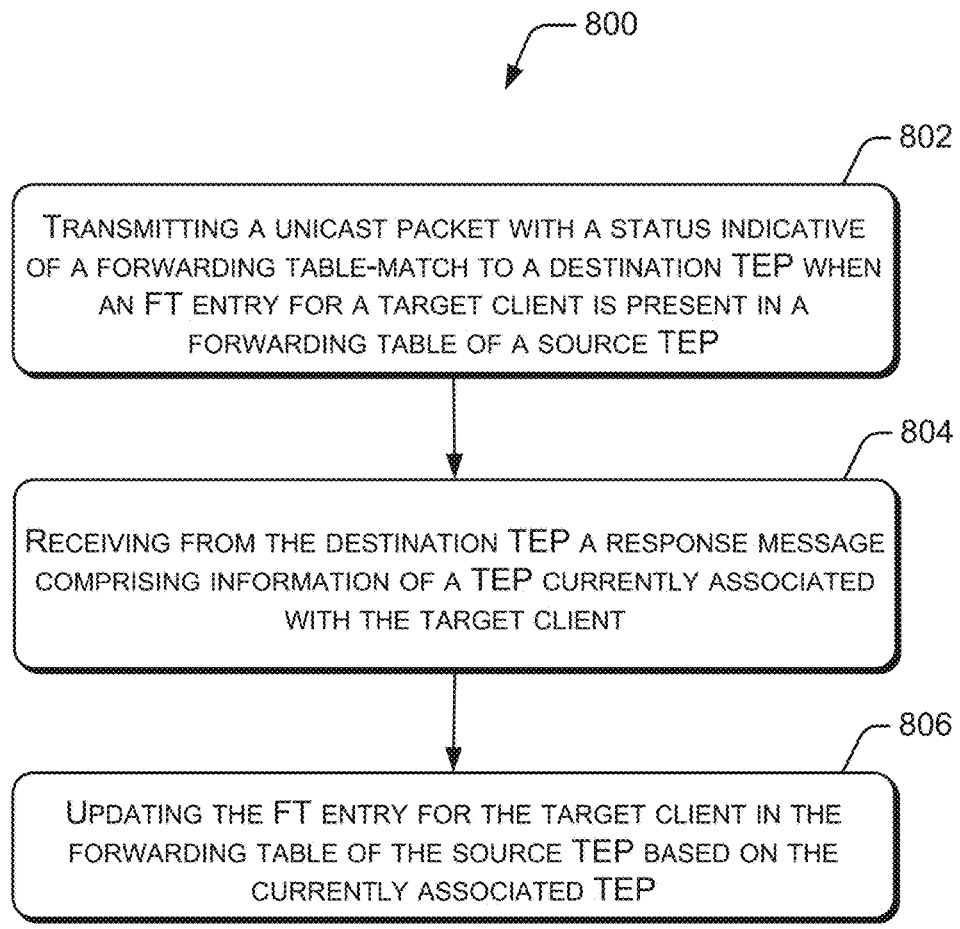
FIG. 8 illustrates a method of client communication in a multi-tenant data center network, according to an example implementation of the present subject matter.

FIG. 8 illustrates a method 800 of client communication in a multi-tenant data center network, according to an example implementation of the present subject matter. The order in which the method 800 is described is not intended to be construed as a limitation, and any number of the described method steps can be combined in any order to implement the method 800. Furthermore, the method 800 can be implemented by processor(s) or computing device(s) through any suitable hardware, a non-transitory machine readable medium, or combination thereof. Further, although the method 800 is described in context of a source TEP in a multi-tenant data center network, other suitable computing devices or systems may be used for execution of at least one step of method 800. It may be understood that steps of method 800 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 8, at block 802, a unicast packet is transmitted to a destination TEP with a status indicative of a forwarding table-match when an FT entry for a target client is present in a forwarding table of a source TEP. At block 804, a response message is received from the destination TEP comprising information of a TEP currently associated with the target client. Based on the information of the currently associated TEP in the response message, the FT entry for the target client is updated in the forwarding table of the source TEP, at block 806. In an example implementation, the response message may include the following information of the target client and a TEP ID as TEP 3. In an example implementation, the response message may also include a timestamp information indicative of a time at which the destination TEP learnt about the currently associated TEP having the target client as a local client. The timestamp information allows the source client to update the FT entry for the target client based on the latest location of the target client.

Further, in an example implementation, the destination TEP may forward the unicast packet to the currently associated TEP with a status indicative of relaying of the unicast packet by the destination TEP to the currently associated TEP. In an example implementation, a reserved bit in a packet header of the unicast packet may be set to a first status, for example '1', to indicate the relaying of the unicast packet, and may be set to a second status, for example '0', to indicate the original transmission of the unicast packet.

Figure 9:
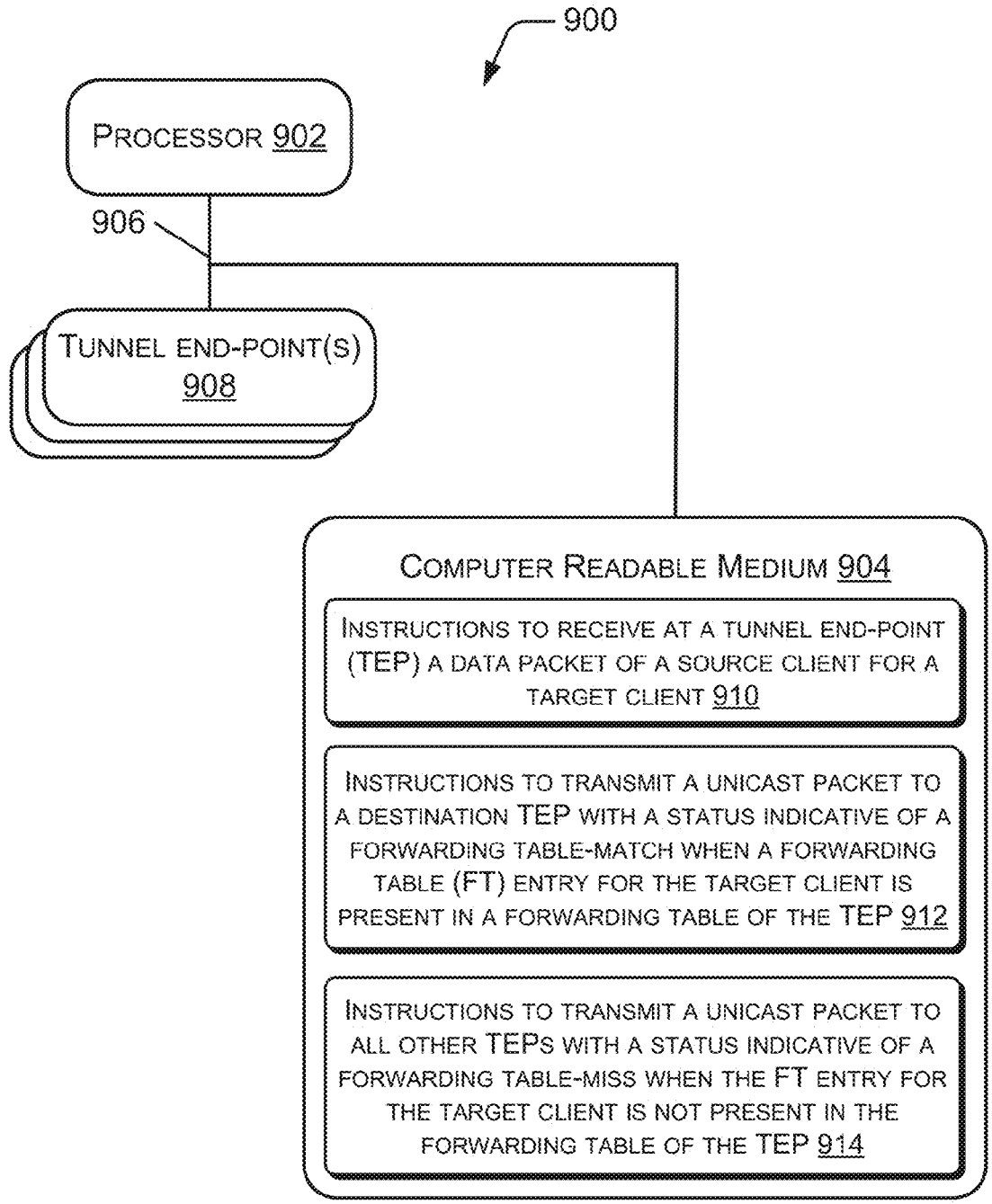
FIG. 9 illustrates a system environment, according to an example implementation of the present subject matter.

FIG. 9 illustrates a system environment 900, according to an example implementation of the present subject matter. In an example implementation, the system environment 900 includes a processor 902 communicatively coupled to a non-transitory computer readable medium 904 through a communication link 906. The processor 902 functions to fetch and execute computer-readable instructions from the non-transitory computer readable medium 904. The processor 902 may be a processing resource of a TEP in an underlay network of a multi-tenant data center network, in accordance with the present subject matter. The processor 902 and the non-transitory computer readable medium 904 are also communicatively coupled to other TEP(s) 908.

The non-transitory computer readable medium 904 can be, for example, an internal memory device or an external memory device. In an example implementation, the communication link 906 may be a direct communication link, such as any memory read/write interface. In another example implementation, the communication link 906 may be an indirect communication link, such as a network interface. In such a case, the processor 902 can access the non-transitory computer readable medium 904 through a network (not shown). The network may be a single network or a combination of multiple networks and may use a variety of different communication protocols.

In an example implementation, the non-transitory computer readable medium 904 includes a set of computer readable instructions that facilitate in reducing the time duration of traffic black hole and utilization of underlay network when a target client is roaming and has moved from one TEP to another TEP. The set of computer readable instructions can be accessed by the processor 902 through the communication link 906 and subsequently executed to perform acts for communication between clients in a multi-tenant data center network.

Referring to FIG. 9, in an example, the non-transitory computer readable medium 904 includes instructions 910 that cause the processor 902 to receive at a TEP a data packet of a source client for a target client. The non-transitory computer readable medium 904 includes instructions 912 that cause the processor 902 to transmit a unicast packet to a destination TEP with a status indicative of a forwarding table-match when an FT entry for the target client is present in a forwarding table of the TEP. The non-transitory computer readable medium 904 includes instructions 914 that cause the processor 902 to transmit a unicast packet to all other TEPs with a status indicative of a forwarding table-miss when the FT entry for the target client is not present in the forwarding table of the TEP.

In an example implementation, the non-transitory computer readable medium 904 may further include instructions that cause the processor 902 to: receive from the destination TEP a response message indicating to delete the FT entry for the target client from the forwarding table of the TEP; and delete the FT entry of the target client from the forwarding table of the TEP.

In an example implementation, the non-transitory computer readable medium 904 may further include instructions that cause the processor 902 to: receive from a TEP currently associated with the target client, a response message indicating that a forwarding table of the currently associated TEP includes an FT entry for the target client, wherein the currently associated TEP is from the other TEPs that received the unicast packet with the status indicative of the forwarding table-miss; and add the FT entry for the target client in the forwarding table of the TEP.

In an example implementation, the non-transitory computer readable medium 904 may further include instructions that cause the processor 902 to: receive from the destination TEP a response message comprising information of a TEP currently associated with the target client; and update the FT entry for the target client in the forwarding table of the TEP based on the currently associated TEP.

Although implementations for client communication in multi-tenant data center networks have been described in language specific to structural features and/or methods, it is to be understood that the present subject matter is not limited to the specific features or methods described. Rather, the specific features and methods are disclosed and explained as example implementations for client communication in multi-tenant data center networks.

I claim:

1. A method of communication between clients in a multi-tenant data center network, the method comprising:
   receiving at a source tunnel end-point (TEP) a data packet of a source client for a target client;
   determining whether a forwarding table of the source TEP includes a first forwarding table (FT) entry for the target client, the first FT entry indicating that a destination TEP is associated with the target client;
   transmitting a first unicast packet with a status indicative of a forwarding table-match in the forwarding table of the source TEP to the destination TEP, in response to the first FT entry for the target client being present in the forwarding table of the source TEP;
   updating the first FT entry to indicate a different TEP, responsive to receiving, by the source TEP from the destination TEP in response to the first unicast packet, a response message indicating that the destination TEP has a second FT entry in a forwarding table of the destination TEP, wherein the second FT entry indicates the different TEP is associated with the target client;
   transmitting a second unicast packet with a status indicative of a forwarding table-miss in the forwarding table of the source TEP to a plurality of other TEPs, in response to the first FT entry for the target client not being present in the forwarding table of the source TEP.

2. The method as claimed in claim 1, comprising:
   deleting the first FT entry for the target client from the forwarding table of the source TEP, responsive to receiving, by the source TEP from the destination TEP in response to the first unicast packet, a response message indicating that the forwarding table of the destination TEP does not include an FT entry for the target client.

3. The method as claimed in claim 1, comprising:
   adding the FT entry for the target client in the forwarding table of the source TEP, responsive to receiving, by the source TEP from a TEP currently associated with the target client in response to the second unicast packet, a response message indicating that a forwarding table of the currently associated TEP includes an FT entry for the target client, wherein the currently associated TEP is one of the plurality of other TEPs that received the second unicast packet.

4. The method as claimed in claim 1, comprising:
   setting a reserved bit in a packet header of the first unicast packet to a first value to indicate the forwarding table-match; and setting a reserved bit in the packet header of the second unicast packet to a second value to indicate the forwarding table-miss.

5. The method as claimed in claim 1, comprising:
forwarding the first unicast packet by the destination TEP to a TEP currently associated with the target client, wherein the forwarded first unicast packet comprises a status indicative of relaying of the first unicast packet by the destination TEP to the currently associated TEP.

6. The method as claimed in claim 1, wherein an indicator of the first unicast packet is set to a first value to indicate the forwarding table-match, and wherein an indicator of the second unicast packet is set to a different second value to indicate the forwarding-table miss.

7. The method as claimed in claim 1, wherein the source TEP, the destination TEP, and the plurality of other TEPs are connected in a mesh network, wherein each TEP connected to the mesh network is one hop away from any other TEP connected to the mesh network.

8. The method as claimed in claim 1, wherein each FT entry of the forwarding table of the source TEP is indicative of a tunneling path to a respective client, and wherein each FT entry of the forwarding table of the destination TEP is indicative of a tunneling path to a respective client.

9. The method as claimed in claim 1, wherein transmitting the second unicast packet to the plurality of other TEPs comprises transmitting multiple copies of the second unicast packet to respective TEPs of the plurality of other TEPs.

10. A destination tunnel end-point (TEP) comprising:
a processor; and
a non-transitory storage medium storing instructions executable on the processor to:
receive, from a source TEP, a unicast packet with data of a source client for a target client, wherein the unicast packet comprises a status indicative of one of a forwarding table-match and a forwarding table-miss in a forwarding table of the source TEP;
determine, based on the status, whether the unicast packet is for the forwarding table-match or the forwarding table-miss; and
in response to determining that the unicast packet is for the forwarding table-match, determine whether a first forwarding table (FT) entry of a forwarding table of the destination TEP indicates that a different TEP is associated with the target client, and in response to determining that the first FT entry indicates that the different TEP is associated with the target client, send, to the source TEP, a response message responsive to the unicast packet with an indication to update a second FT entry of a forwarding table of the source TEP to indicate the different TEP.

11. The system as claimed in claim 10, wherein the instructions are executable on the processor to:
in response to determining that an FT entry for the target client is not present in the forwarding table of the destination TEP, send a response message to the source TEP indicating to delete an FT entry for the target client from the forwarding table of the source TEP.

12. The system as claimed in claim 10, wherein, when the unicast packet is determined to be for the forwarding table-match, the TEP is to:
in response to determining that the first FT entry indicates that the different TEP is associated with the target client, forward the unicast packet to the different TEP with a status indicative of relaying of the unicast packet to the different TEP.

13. The system as claimed in claim 12, wherein the instructions are executable on the processor to set a reserved bit in a packet header of the unicast packet to a first value to indicate the relaying of the unicast packet.

14. The system as claimed in claim 12, wherein the instructions are executable on the processor to add in the response message timestamp information indicative of a time at which the destination TEP learnt about the different TEP.

15. The system as claimed in claim 10, wherein the instructions are executable on the processor to:
in response to determining that the unicast packet is for the forwarding table-miss, determine whether a forwarding table of the destination TEP includes an FT entry for the target client; and
in response to determining that the FT entry for the target client is present in the forwarding table of the destination TEP, send another response message to the source TEP indicating to add an FT entry for the target client in the forwarding table of the source TEP.

16. The system as claimed in claim 15, wherein the instructions are executable on the processor is to add in the another response message a timestamp information indicative of a time at which the destination TEP learnt about the target client.

17. A non-transitory computer-readable medium comprising instructions for communication between clients in a multi-tenant data center network, the instructions upon execution causing a source tunnel end-point (TEP) to:
receive a data packet of a source client for a target client;
transmit, to a destination TEP, a first unicast packet with a status indicative of a forwarding table-match in a forwarding table of the source TEP, in response to a first forwarding table (FT) entry for the target client being present in a forwarding table of the source TEP, the first FT entry indicating that a destination TEP is associated with the target client;
update the first FT entry to indicate a different TEP, responsive to receiving, by the source TEP from the destination TEP in response to the first unicast packet, a response message indicating that the destination TEP has a second FT entry in a forwarding table of the destination TEP, wherein the second FT entry indicates the different TEP is associated with the target client; and
transmit a second unicast packet to a plurality of other TEPs with a status indicative of a forwarding table-miss in the forwarding table of the source TEP, in response to the first FT entry for the target client not being present in the forwarding table of the source TEP.

18. The non-transitory computer-readable medium as claimed in claim 17, comprising instructions that upon execution cause the source TEP to:
delete the first FT entry of the target client from the forwarding table of the TEP responsive to receiving from the destination TEP a response message indicating that the forwarding table of the destination TEP does not include an FT entry for the target client.

19. The non-transitory computer-readable medium as claimed in claim 17, wherein each FT entry of the forwarding table of the source TEP is indicative of a tunneling path to a respective client, and wherein each FT entry of the forwarding table of the destination TEP is indicative of a tunneling path to a respective client.

20. The non-transitory computer-readable medium as claimed as claimed in claim 17, wherein transmitting the second unicast packet to the plurality of other TEPs comprises transmitting multiple copies of the second unicast packet to respective TEPs of the plurality of other TEPs.

* * * * *